United States Patent
Lazaro-Gredilla et al.

(10) Patent No.: US 11,157,793 B2
(45) Date of Patent: Oct. 26, 2021

(54) METHOD AND SYSTEM FOR QUERY TRAINING

(71) Applicant: Vicarious FPC, Inc., Union City, CA (US)

(72) Inventors: Miguel Lazaro-Gredilla, Union City, CA (US); Wolfgang Lehrach, Union City, CA (US); Nishad Gothoskar, Union City, CA (US); Guangyao Zhou, Union City, CA (US); Antoine Dedieu, Union City, CA (US); Dileep George, Union City, CA (US)

(73) Assignee: Vicarious FPC, Inc., Union City, CA (US)

( * ) Notice: Subject to any disclaimer, the term of this patent is extended or adjusted under 35 U.S.C. 154(b) by 0 days.

(21) Appl. No.: 17/077,542

(22) Filed: Oct. 22, 2020

(65) Prior Publication Data

US 2021/0125030 A1    Apr. 29, 2021

Related U.S. Application Data

(60) Provisional application No. 62/925,930, filed on Oct. 25, 2019, provisional application No. 62/986,903, filed on Mar. 9, 2020.

(51) Int. Cl.
*G06N 3/04* (2006.01)
*G06N 3/08* (2006.01)
*G06F 16/2458* (2019.01)

(52) U.S. Cl.
CPC ............... *G06N 3/04* (2013.01); *G06N 3/08* (2013.01); *G06F 16/2471* (2019.01)

(58) Field of Classification Search
CPC ............ G06N 3/04; G06N 3/08; G06N 7/005; G06N 20/00; G06F 16/2471
See application file for complete search history.

(56) References Cited

U.S. PATENT DOCUMENTS

2012/0065976 A1    3/2012    Deng et al.
2018/0204360 A1    7/2018    Bekas et al.

FOREIGN PATENT DOCUMENTS

WO         2018217863 A1    11/2018

OTHER PUBLICATIONS

Bengio, Yoshua et al.; Modeling High-Dimensional Discrete Data with Multi-Layer Neural Networks; Neural Information Processing Systems 1999; pp. 400-406. (Year: 1999).*
Koller, Daphne et al.; Probabilistic Graphical Models—Principles and Techniques; Introduction; MIT Press 2009; pp. 1-14. (Year: 2009).*

(Continued)

*Primary Examiner* — Stanley K. Hill
(74) *Attorney, Agent, or Firm* — Jeffrey Schox; Diana Lin

(57) ABSTRACT

The method for query training can include: determining a graphical representation, determining an inference network based on the graphical representation, determining a query distribution, sampling one or more train queries from the query distribution, and optionally determining a trained inference network by training the untrained inference network using the train query. The method can optionally include determining an inference query and determining an inference query result for the inference query using the trained inference network.

20 Claims, 7 Drawing Sheets

(56) References Cited

OTHER PUBLICATIONS

Koller, Daphne et al.; Probabilistic Graphical Models—Principles and Techniques; Table of Contents; MIT Press 2009; p. x-xxi. (Year: 2009).*
Sucar, Luis Enrique et al.; Probabilistic Graphical Models—Principles and Applications; Springer 2015; Advances in Computer Vision and Pattern Recognition; 267 pages. (Year: 2015).*
Zhang, Zhen et al.; Factor Graph Neural Network; 2019; pp. 1-14. (Year: 2019).*
Satorras, Victor Garcia et al.; Neural Enhanced Belief Propagation on Factor Graphs; arXiv:2003.01998v4 [cs.LG] Jun. 24, 2020; pp. 1-10. (Year: 2020).*
Abadi, Martin, et al., "TensorFlow: Large-Sale Machine Learning on Heterogeneous Distributed Systems", Preliminary White Paper, Nov. 9, 2015.
Besag, Julian, "Statistical Analysis of Non-Lattice Data", the Statistician, vol. 24, No. 3, (Sep. 1975), pp. 179-195.
Blei, David M., et al., "Variational Inference: A Review for Statisticians", https://arxiv.org/abs/1601.00670, submitted Jan. 4, 2016.
Bradley, Joseph K., "Learning Large-Scale Conditional Random Fields", Thesis, School of Computer Science, Carnegie Mellon University, Pittsburgh, PA 15213, Jan. 2013.
Cormack, G.V., et al., "Data Compression Dynamic Markov Modelling", the Computer Journal, vol. 30, No. 6, 1987, pp. 541-550.
Freeman, Bill, et al., "Lecture 7: graphical models and belief propagation", Sep. 26, 2013 MIT EECS course 6.869.
Hawkins, Jeff, et al., "Sequence memory for prediction, inference and behaviour", Phil. Trans. R. Soc. B (2009) 364, 1203-1209.
Hinton, Geoffrey E., "Training Products of Experts by Minimizing Contrastive Divergence", Neural Computation, vol. 14, Issue 8, Aug. 2002, p. 1771-1800.
Hyvarinen, Aapo, "Consistency of pseudo likelihood estimation of fully visible Boltzmann machines", HIIT Basic Research Unit, Dept. of Computer Science, University of Helsinki, Finland, Neural Computation, in press, Jun. 13, 2006.
Kingma, Diederik P., et al., "Adam: A Method for Stochastic Optimization", Published as a conference paper at ICLR 2015.
Kingma, Diederik P., et al., "Auto-Encoding Variational Bayes", arXiv preprint arXiv:1312.6114 (2013).
Kuleshov, Volodymyr, et al., "Neural Variational Inference and Learning in Undirected Graphical Models", 31st Conference on Neural Information Processing Systems (NPIS 2017), Long Beach, CA, USA, https://arxiv.org/abs/1711.02679, submitted on Nov. 7, 2017.
Lecun, Yann, et al., "The MNIST Database", http://yann.lecun.com/exdb/mnist/.
Li, Stan Z., "Markov Random Field Modeling in Image Analysis", book, originally published 2001.
Li, Chongxuan, et al., "To Relieve Your Headache fo Training an MRF, Take AdVIL", Published as a conference paper at ICLR 2020, https://arxiv.org/abs/1901.08400, submitted Jan. 24, 2019.
Lin, Guosheng, et al., "Deeply Learning the Message in Message Passing Inference", https://arxiv.org/abs/1506.02108, submitted Jun. 6, 2015.
Marlin, Benjamin M., et al., "Inductive Principles for Restricted Boltzmann Machine Learning", Proceedings of the Thirteenth International Conference on Artificial Intelligence and Statistics, JMLR Workshop and Conference Proceedings 9:509-516, 2010.
Minka, Thomas P., "Expectation Propagation for Approximate Bayesian Inference", UAI 2001, pp. 362-369.

Murphy, Kevin P., "Loopy Belief Propagation for Approximate Inference: An Empirical Study", https://arxiv.org/abs/1301.6725, submitted on Jan. 23, 2013.
O'Herron, Philip, et al., "Remapping of Border Ownership in the Visual Cortex", the Journal of Neuroscience, Jan. 30, 2013, 33(5): 1964-1974.
O'Herron, Philip, et al., "Short-Term Memory for Figure-Ground Organization in the Visual Cortex", Neuron, Mar. 12, 2009; 61(5): 801-809.
Paszke, Adam, et al., "PyTorch: An Imperative Style, High-Performance Deep Learning Library", 33rd Conference on Neural Information Processing Systems (NeurIPS 2019), Vancouver, Canada.
Pedregosa, Fabian, et al., "Scikit-learn: Machine Learning in Python", Journal of Machine Learning Research 12(2011) 2825-2830.
Rezende, Danilo J., et al., "Stochastic Backpropagation and Approximate Inference in Deep Generative Models", Proceedings of the 31st International Conference on Machine Learning, Beijing, China 2014, JMLR: W&CP vol. 32.
Sutton, Charles, et al., "Local Training and Belief Propagation", Microsoft Research Ltd., MSR-TR-2006-121, Aug. 10, 2006.
Sutton, Charles, et al., "Piecewise Pseudolikelihood for Efficient Training of Conditional Random Fields", Computer Science Department Faculty Publication, 62, 2007, Serieshttps://scholarworks.umass.edu/cs_faculty_pubs/62/?utm_source=scholarworks.umass.edu/cs_faculty_pubs/62&utm_medium=PDF&utm_campaign=PDFCoverPages.
Sutton, Charles, et al., "Piecewise Training for Undirected Models", Published 2005 Computer Science, Mathematics ArXiv, https://www.semanticscholar.org/paper/Piecewise-Training-for-Undirected-Models-Sutton-McCallum/beb0766d6233836ac1203b224930dc037e2b1dff.
Tieleman, Tijmen, "Training Restricted Boltzmann Machines using Approximations to the Likelihood Gradient", Proceedings of the 25th International Conference on Machine Learning Helsinki, Finland, 2008.
Titsias, Michalis K., et al., "Doubly Stochastic Variational Bayes for non-Conjugate Inference", Proceedings of the 31st International Conference on Machine Learning, Beijing, China, 2014. JMLR: W&CP vol. 32.
Van Den Oord, Aaron, et al., "Pixel Recurrent Neural Networks", Proceedings of the 33rd International Conference on Machine Learning, New York, New York, USA, 2016, JMLR: W&CP col. 48.
Welling, Max, et al., "Learning in Markov Random Fields with Contrastive Free Energies", Published in AISTATS 2005, Mathematics, Computer Science.
Xu, Jian, et al., "Representing higher-order dependencies in networks", Sci. Adv. 2016;2:e1600028, May 20, 2016.
Yedidia, Jonathan S., et al., "Understanding Belief Propagation and its Generalizations", https://www.merl.com/publications/docs/TR2001-22.pdf, TR2001-22 Nov. 2001.
Yoon, Kijung, et al., "Inference in Probabilistic Graphical Models by Graph Neural Networks", https://arxiv.org/abs/1803.07710, submitted on Mar. 21, 2018.
Zhaoping, Li, "Border Ownership from Intracortical Interactions in Visual Area V2", Neuron, vol. 47, 143-153, Jul. 7, 2005.
Zhou, Hong, et al., "Coding of Border Ownership in Monkey Visual Cortex", the Journal of Neuroscience, Sep. 1, 2020, 20(17):6594-6611.
International Search Report and Written Opinion for application No. PCT/US20/56824 dated Feb. 5, 2021.
Chechetka, Anton, "Query-Specific Learning and Inference for Probabilistic Graphical Models", Carnegie Mellon University, School of Computer Science, Doctoral Dissertation [online] Jun. 8, 2011, http://ww.cs.cmu.edu/-antonc/publications/thesis-draft.pdf.

* cited by examiner

METHOD AND SYSTEM FOR QUERY TRAINING

CROSS-REFERENCE TO RELATED APPLICATIONS

This application claims the benefit of both U.S. Provisional Application Ser. No. 62/925,930, filed on 25 Oct. 2019 and U.S. Provisional Application Ser. No. 62/986,903, filed 9 Mar. 2020, which are incorporated in their entirety by this reference.

TECHNICAL FIELD

This invention relates generally to the artificial intelligence field, and more specifically to a new and useful method for query training in the artificial intelligence field.

BACKGROUND

Probabilistic graphical models (PGMs) provide a compact representation of knowledge that can be queried in a flexible way: after learning parameters of a graphical model, new probabilistic queries can be answered at test time without re-training. However, learning undirected graphical models is challenging due to the intractability of partition function calculation and integrating out hidden variables. For directed models, a popular approach is to use variational autoencoders, but there is no systematic way to choose the encoder architecture given the PGM, and the encoder only amortizes inference for a single probabilistic query (i.e., new queries require separate training).

Thus, there is a need for a new and useful system and method for approximating a probabilistic graphical model that enables flexible querying.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 1:
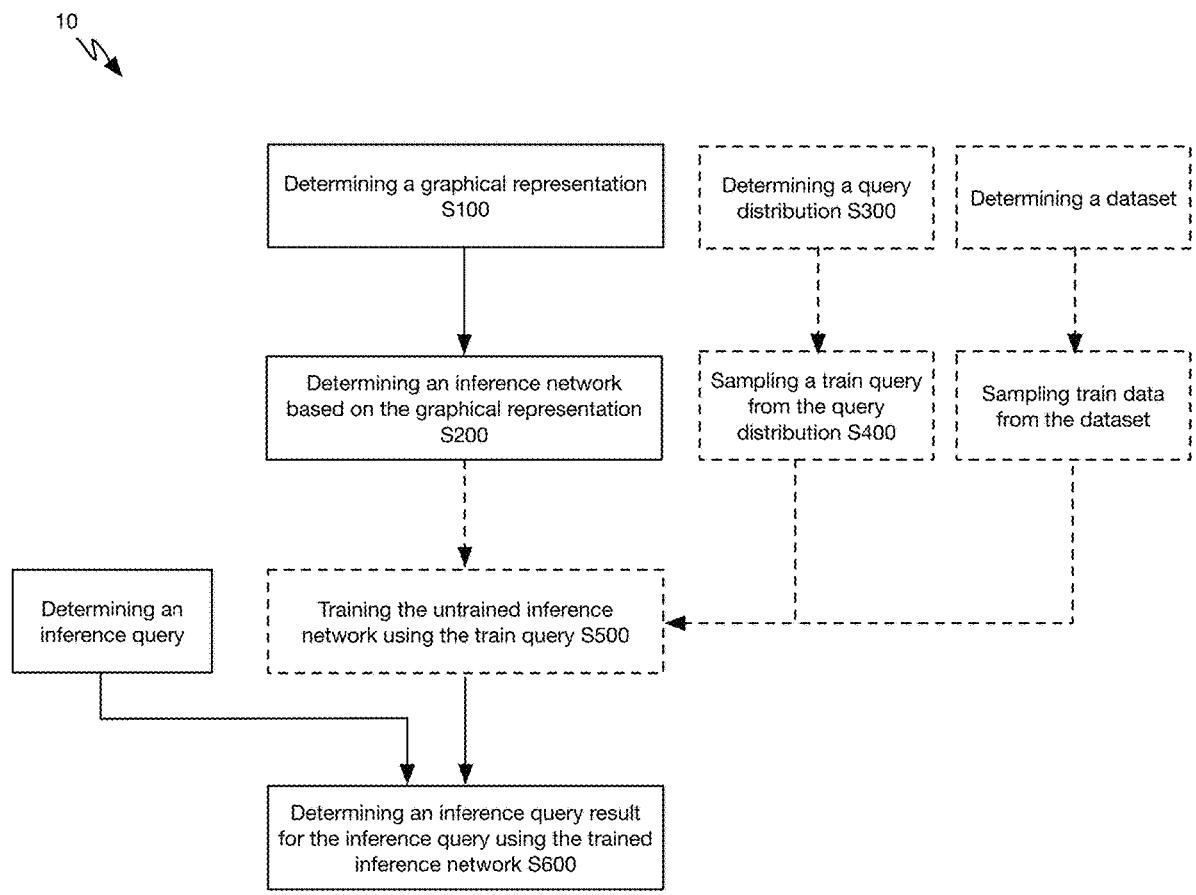
FIG. 1 is a schematic representation of the method.

As shown in FIG. 1, the method 10 preferably includes determining a graphical representation S100, determining an inference network based on the graphical representation S200, determining a query distribution S300, sampling a train query from the query distribution S400, and optionally determining a trained inference network by training the untrained inference network using the train query S500. The method can optionally include determining an inference query and determining an inference query result for the inference query using the trained inference network S600. However, the method can additionally or alternatively include any other elements.

Figure 2:
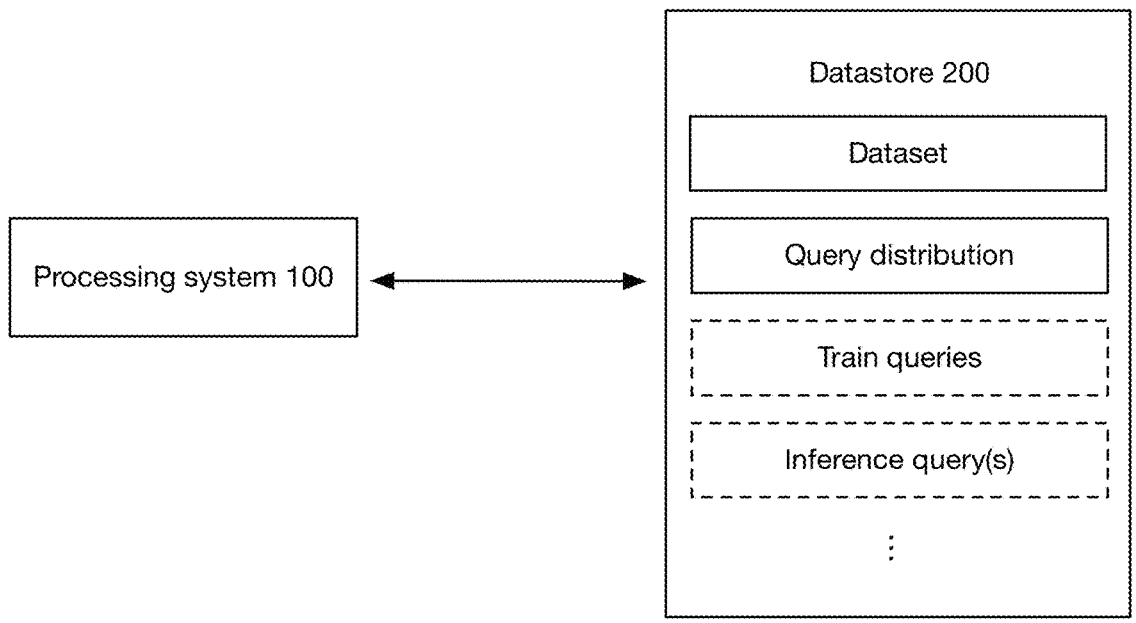
FIG. 2 is a schematic representation of the system.

As shown in FIG. 2, the system 20 for query training can include one or more processing systems 100, one or more datastores 200, and/or any other suitable components.

2. Examples.

Figure 3:
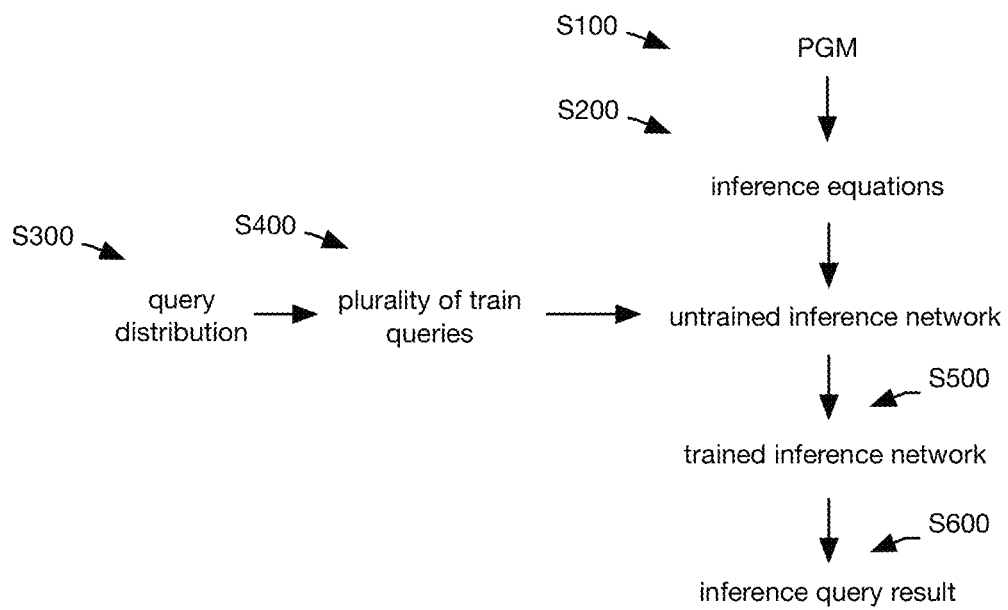
FIG. 3 is an embodiment of the method.

In a first example, the method and system can include determining a graphical representation, determining inference equations for the graphical representation (e.g., belief propagation equations, variational inference equations, etc.; e.g., by deriving equations in the form of inference equations from the respective probabilistic graphical model's (PGM) potential function), unrolling the inference equations into a plurality of layers of a single inference network (e.g., neural network), which can be used to answer arbitrary queries, training the parameters of the inference network using different types of queries sampled from a query distribution, and using the trained inference network for flexible querying as if it were a probabilistic graphical model. The PGM is preferably untrained, but can be trained. An example is depicted in FIG. 3.

In a second example, given a PGM for the set of variables $x=\{x_1, \ldots, x_N\}$ of a train sample, the system and method can compute conditional marginal probabilistic queries of the form:

$$p(x_{target}|\{x_i\}_{i \in evidence})$$

$$\forall target \in \{1, \ldots, N\}, \forall \text{ evidence} \subset \{1, \ldots, N\} \quad (1)$$

where $x_{target}$ is a single output variable, and "evidence" is the subset of remaining input variables for which evidence is available. Evidence can be hard (e.g., known) or soft (e.g., evidence can be noisy). Any variables that do not correspond to the input nor the output are marginalized out in the above query. Queries which do not fit Eq. (1) directly (e.g., the joint distribution of two output variables) can be decomposed into a combination of conditional marginal queries by using the chain rule of probability.

During inference network training, queries can be sampled from a query distribution, that is, the inference network is trained on multiple different combinations of output variables rather than a single set of output variables. For example, an output variable of one train query can include an input variable of another train query, wherein the inference network learns a single set of weights (e.g., graphical parameter values) for both queries.

Figure 4:
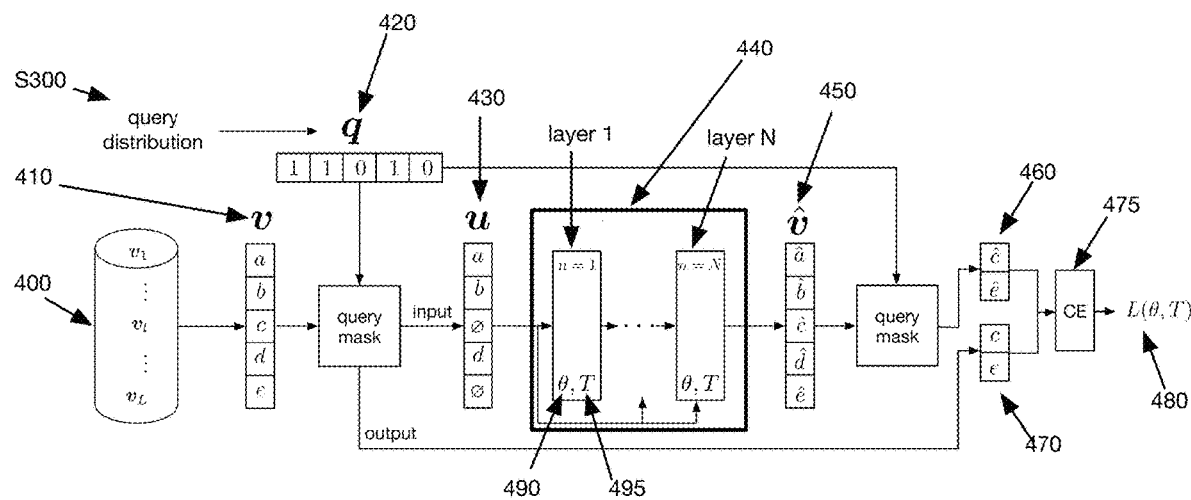
FIG. 4 depicts an example of the method.

During training, a mask, describing a train query 420 from the query distribution, can be used to mask out values of the sampled train data samples 410 (e.g., the mask can split the train data sample into input and output variables) to determine a unary representation 430 (e.g., that includes ground truth values for input variables and masked-out values for output variables) that can be fed as input into the inference network 440. The train data sample can be sampled from the dataset 400. The masked-out portion of the train data sample can be used as ground truth values for output variables 470. The output of the inference network 450 can include estimated values for the output variables (the output representation 460), which can be compared against the ground truth values of the output variables 470 (e.g., determined by masking the train data sample 410 with an inverse query mask). The inference network 440 can also output estimated values for the input variables; in this variant, the output 450 can also be masked using the inverse query mask to determine the output representation 460. Alternatively, no mask can be provided, where only the training data and ground truth are provided (e.g., for segmentation use cases). The comparison 475 can be used to train the inference network by generating a loss 480 and using the loss during back propagation (e.g., determine a set of values for the graphical parameters 490 and/or for a temperature parameter 495, and/or any other suitable parameter of the inference network). An example is depicted in FIG. 4.

The system and method can be used in a variety of use cases (e.g., any use case that a PGM would be suitable for).

Figure 5:
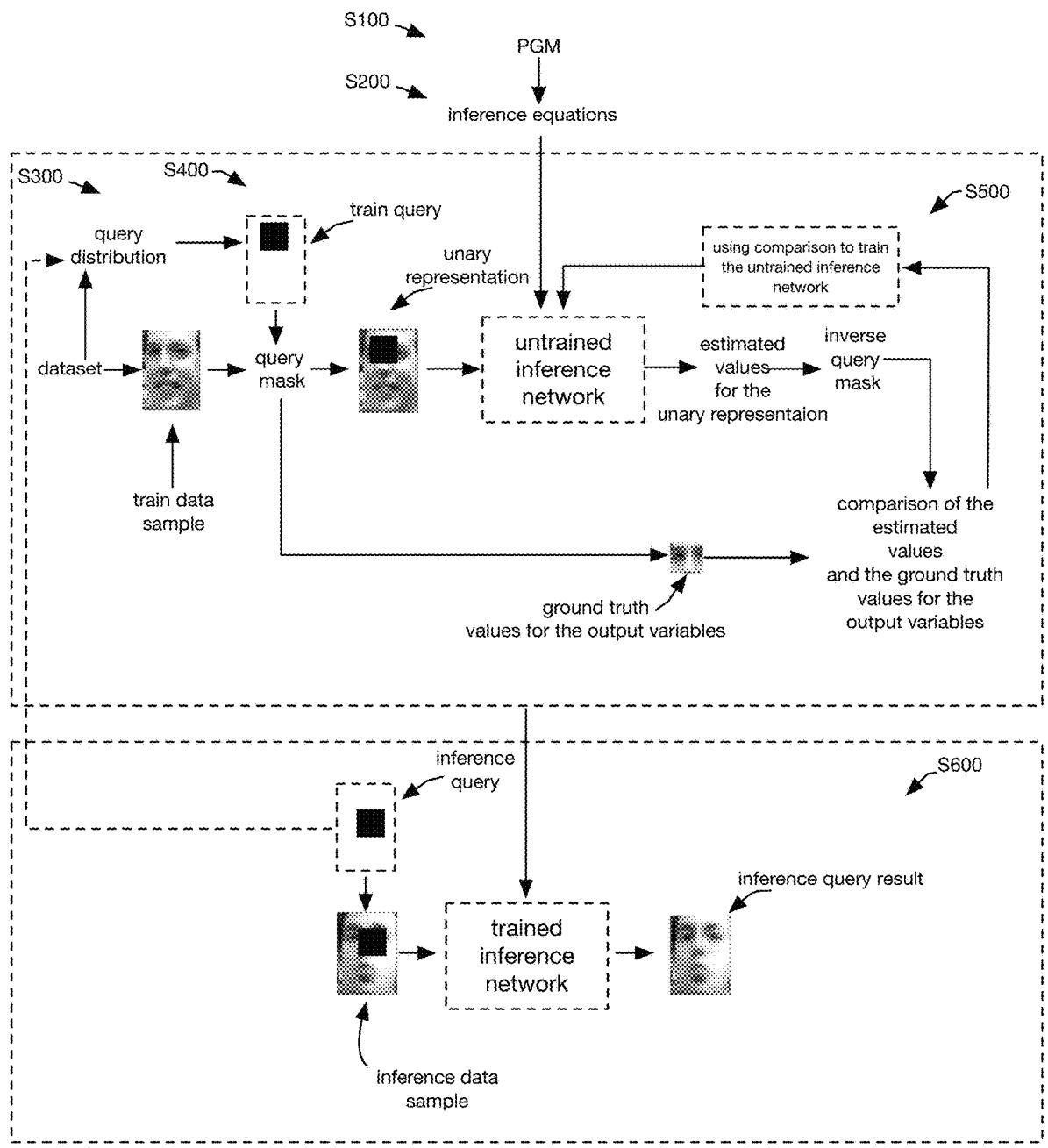
FIG. 5 depicts an example of the method.

In a first example use case, the system and method can be used for inpainting images. Each train sample can be an image and each train query can specify a region of the image that is blocked out (e.g., the pixels blocked out are the output variables and the pixels not blocked-out are the input variables). Each blocked output pixel can be estimated separately given the not blocked-out pixels. Thus, the inference network can learn the appropriate weights to determine the pixel values of the blocked-out region. An example of the method used for image inpainting is depicted in FIG. 5.

Figure 6:
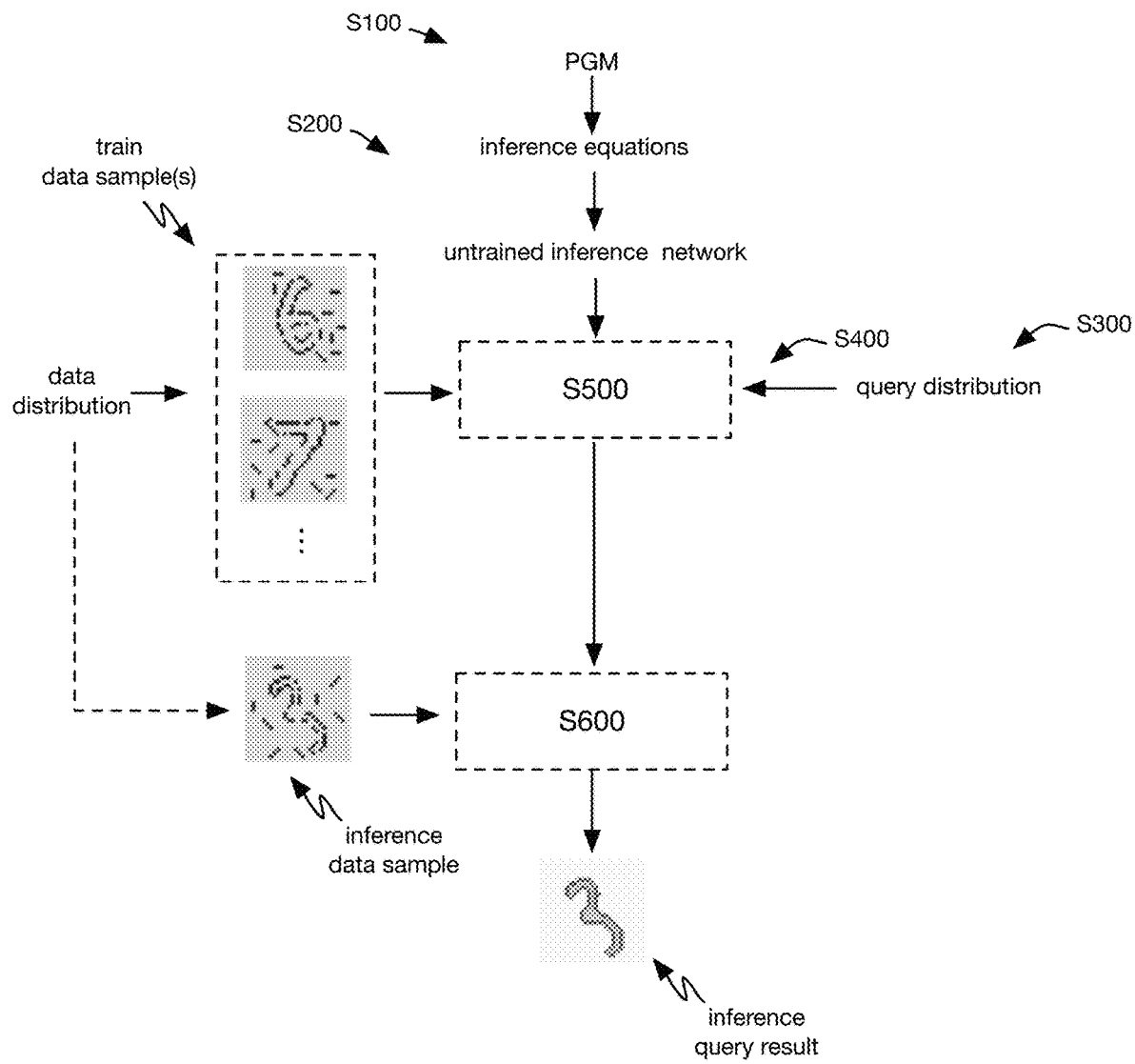
FIG. 6 depicts an example of the method.

In a second example use case, the system and method can be used for image segmentation. Each train sample can be an image and the train query can specify a boundary and/or a set of edges that can include noise (e.g., pixels that are not included in the edges or the boundaries). Alternatively, the train sample can include a training pair of noisy inputs and their corresponding ground truths (e.g., ground truth segmentation). The trained inference network can distinguish background pixels from foreground pixels, edges, boundaries, and/or any other suitable image feature. The trained inference network can also denoise the train sample. An example of the method used for image segmentation is depicted in FIG. 6.

In a third example use case, the system and method can be used for natural language processing. Each train sample can be a sentence and the train query can mask out one or more words of the train sample. The trained inference network can infer the words masked out by the train query.

However, the system and method can be used in any other suitable use case.

3. Benefits.

The method can confer several benefits over conventional systems.

First, the system and method can approximate a probabilistic graphical model using an approximate inference algorithm that is invariant to scale. Since the approximate inference algorithm is invariant to scale, partition function computation is not necessary. Furthermore, the approximate inference algorithm can be cast as an optimization problem (e.g., unrolled into a single inference network) that can be solved iteratively.

Second, the system and method can enable flexible querying of the inference network by determining a query distribution from which to sample train queries and inference queries. The train queries can define different input and output variables. For example, an input variable of a first train query can be an output variable of a second query. Sampling from the query distribution to train the inference network thus enables flexible querying at inference time without re-training the network. That is, a single set of parameters is learned for multiple different queries sampled from the query distribution, such that at inference, a new inference query result can be determined without needing to re-train the inference network. In other words, the system and method adapts learning to inference according to a query distribution, which can be adjusted to provide generalization capabilities.

Third, each layer of the inference network shares the same set of parameters, thus reducing the memory required to store the model.

Fourth, the system and method can learn a neural network approximating any PGM (e.g., even undirected PGMs with hidden variables), wherein the neural network includes weights representative of the PGM's parameters (e.g., observable variables, hidden variables, parameters θ, etc.) and each layer is representative of an iteration of the PGM. However, in variants, the resultant PGM determined from the trained respective neural network (e.g., by mapping the weights back to the respective parameters θ) is a worse model of the data (as measured by the likelihood), but it is tuned to produce better marginals for a given inference algorithm. This resultant PGM can preserve the querying flexibility of the original PGM; at test time, the marginal of any variable given any partial evidence can be estimated.

Fifth, the PGM-based inference network can be simpler to implement than conventional PGM training. In examples, the system and method can leverage inference methods for training and/or inference.

However, the method and system can confer any other suitable benefits.

4. Method.

The method preferably includes determining a graphical representation S100, determining an inference network based on the graphical representation S200, determining a query distribution S300, sampling a plurality of train queries from the query distribution S400, and optionally determining a trained inference network by training the untrained inference network using the plurality of train queries S500. The method can optionally include: determining an inference query and determining an inference query result for the inference query using the trained inference network S600. However, the method can additionally or alternatively include any other elements.

The method is preferably performed using the system 20, but can be performed by any other suitable system. The system 20 (example shown in FIG. 2) can include: one or more processing systems (e.g., remote computing system, such as a server system, distributed computing system, etc.), interfaces (e.g., interfacing with the processing systems), one or more datastores (e.g., storing datasets, query distributions, train queries, train data, the inference network, etc.), and/or any other suitable components. Training and inference are preferably performed by different computing systems, but can alternatively be performed by the same computing system.

Determining a graphical representation S100 functions to select a structure associated with the underlying phenomenon being modeled (e.g., the use case), wherein the graphical representation can be used to model the dataset. The graphical representation can be determined manually, automatically based on the dataset or use case (e.g., using rules, heuristics, etc.), and/or otherwise determined. The graphical representation is preferably a knowledge representation that can be used to model the dataset. The graphical representation is preferably a probabilistic graphical model (PGM), but can additionally or alternatively be any other suitable graphical model. The graphical representation can be directed, undirected, and/or otherwise defined. The graphical representation can include hidden variables or not include hidden variables. The graphical representation and/or the potential function 110 is preferably unnormalized, but can alternatively be normalized. The graphical representation can be a Markov random field (MRF), a grid MRF, a pairwise MRF, an RBM, a DBM, GRBM, RCN, and/or any other suitable PGM.

In a specific example, the RCN listed above can be the RCN described in U.S. application Ser. No. 13/895,225, filed 15 May 2013, which is incorporated in its entirety by this reference.

The graphical representation can be represented using a potential function 110 (e.g., contingency function of the graphical representation's arguments assigning a "pre-probabilistic" score of their joint configuration) and optionally a partition function (e.g., specifying the normalization constants), but can be otherwise represented.

The graphical representation can be parametrized by a set of graphical parameters (e.g., determine node connections in a graphical representation). The graphical parameters can be vectors, matrices, and/or any other suitable data structure. The graphical parameters can be associated with values, which can be binary, real numbers, and/or any other suitable numbers.

The graphical representation is preferably untrained, but can alternatively be trained or otherwise prepared.

In a specific example, the graphical representation can be a graphical model $\varphi(v, h; \vartheta)$ where v are the visible variables in the dataset, h are the hidden variables in the dataset, and $\vartheta$ are the graphical parameters. The graphical model can alternatively be represented as $\varphi(x; \vartheta)$, where x encompasses both v and h.

However, the graphical representation can be otherwise determined.

Figure 7:
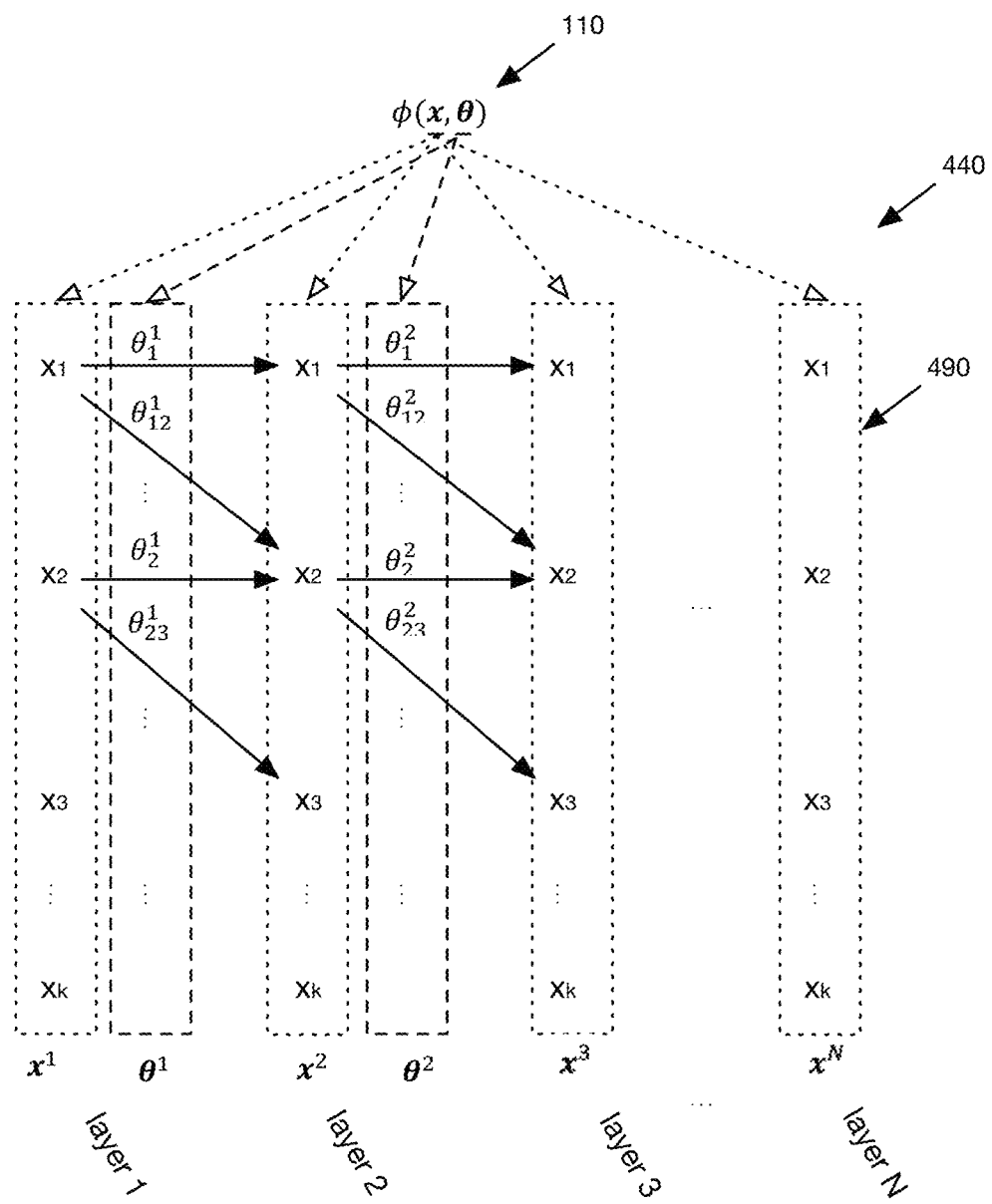
FIG. 7 is a schematic representation of an example untrained inference network.

Determining an inference network based on the graphical representation S200 functions to represent the graphical representation as a trainable inference network, which can be used to estimate conditional marginal probabilistic variables (e.g., defined by a train query). The inference network is preferably a neural network that is parametrized by the graphical parameters (e.g., $\vartheta$). The inference network can be untrained, trained, and/or otherwise characterized (e.g., the graphical parameters can be unlearned, learned or otherwise specified). The inference network preferably includes N layers, which correspond to N iterations of the approximate inference algorithm (e.g., loopy belief propagation, belief propagation, variational inference, etc.), but can have any other suitable number of layers. An example of the inference network is shown FIG. 7, The weights of the inference network preferably correspond to the graphical parameters (e.g., wherein each weight represents one graphical parameter; one graphical parameter is represented by multiple weights; etc.), but can be otherwise related to the graphical representation. The weights of the inference network are preferably shared across all layers (e.g., each layer has the same set of weights; each layer has the same set of values for the weights, etc.), but the layers can alternatively share a subset of the weights or be otherwise related. In a specific example, the weights of each layer have the same value (e.g., $\theta^1 = \theta^2$; $\theta_{ijk\ldots}{}^n = \theta_{xyz\ldots}{}^m$, where n and m represent layers, and i, j, k, x, y, and z represent nodes). The initialized inference network is preferably "blank," wherein the weights do not have values, or are initialized to a predetermined initialization value. Alternatively, the weights can be initialized to the values of the graphical representation's graphical parameters, or be otherwise initialized. The layers of the inference network can have the same set of nodes (e.g., $x^n = x^m$), but can alternatively have different sets of nodes. The nodes of the inference network are preferably representative of the potential function variables (e.g., visible variables and/or hidden variables), but can be otherwise determined.

The inference network preferably determines an output estimate for each of a plurality of output variables, wherein each output estimate is determined using a set of input variables (e.g., from the train sample).

The inference network preferably receives a training input, represented as a unary representation (e.g., the values of the input variables of the train sample that are not masked out by the train query) and the output estimate preferably determines estimated values for the output variables of the train sample. The unary representation can include one or more unary factors (e.g., as a vector, as a set, etc.). Each layer of the inference network preferably receives the unary representation as input, but additionally or alternatively only the first layer can receive the unary representation as input. However, the inference network can additionally or alternatively be otherwise defined.

S200 can include: determining an inference algorithm having an inference equation form, unrolling the derived inference algorithm into the inference network, and deriving inference equations having the inference equation form from the graphical representation equations. However, S200 can be otherwise performed.

Determining the inference algorithm functions to select an inference algorithm to structure the resultant inference network. The inference algorithm is preferably configured to perform marginal inference in the presence of unobserved variables, but can alternatively be otherwise configured. The inference algorithm is preferably a preexisting inference algorithm that is associated with predetermined training and/or inference methods, but can alternatively be a novel inference algorithm or other inference algorithm. Examples of inference algorithms that can be used include: belief propagation (e.g., loopy belief propagation (LBP)), variational inference, rules, heuristics, and/or other inference algorithms. The inference algorithm can be: predetermined (e.g., always used for query training), determined based on the use case (e.g., query type, data type, hardware, etc.), determined based on the graphical representation, manually selected, or otherwise determined.

Unrolling the inference equations to generate the untrained inference network can include unrolling the inference equations for a predetermined number of iterations N (e.g., 5, 10, 25, 50, 150, 200, etc.) wherein each iteration is a layer of the inference network. Unrolling the inference equations can be performed automatically by the processing system, manually, and/or otherwise performed.

Deriving the inference equations functions to convert the graphical representation into the inference algorithm format, such that the graphical representation is compatible with training and inference methods for the inference algorithm. The inference equations are preferably determined using the potential function 110 of the graphical representation, but can additionally or alternatively be determined using a transfer function of the graphical representation and/or any other suitable function.

The inference equations are preferably associated with a timestep (e.g., the inference equations can be used to represent the graphical representation at a particular timestep). The inference equations preferably include the graphical parameters, a temperature parameter, and/or any other suitable parameter. The inference equations are preferably determined using loopy belief propagation, but can additionally or alternatively be determined using belief propagation, variational inference, rules, heuristics and/or any other suitable algorithm. Determining the inference equations can be performed automatically by the processing system, manually, and/or otherwise determined.

Deriving the inference equations can include: extracting the graphical parameters ($\vartheta$) from the graphical representation's potential function 110 ($\phi(x,\theta)$); determining a temperature (T) for message passing; determining N iterations; and deriving a set of feed-forward functions from $\vartheta$ and T, wherein the feed-forward functions have the inference algorithm equations' form. N and T can be predetermined, automatically determined, determined based on the type of propagation (e.g., T=1 to retrieve standard sum-product belief propagation or T=0 to retrieve the max product belief revision), or otherwise determined.

In a first example, deriving the inference equations includes: encoding the available evidence v and the query q in unary representations u; unrolling the inference algorithm over N iterations as a neural network with N layers; and deriving the message functions (for message passing between the N layers) from the graphical parameters (e.g., $\vartheta$) and T.

Encoding the available evidence v and the query q in unary representations u can include combining the available evidence v and the query q into the set of unary factors. Unary factors preferably specify a probability density function over a variable ($u_i$). For each dimension inside v that q labels as "input", a delta (e.g., Dirac, Kronecker, etc.) centered at the value of that dimension is provided. For "output" dimensions (e.g., variables that q masks out) and hidden variables, the unary factor can be set to an uninformative, uniform density. Any soft evidence can optionally be incorporated through a separate density function. In a specific example, the resultant unary representation (e.g., vector) of factors u only contains informative densities about the inputs and whose dimensionality is the sum of the dimensionalities of v and h. Each dimension of u will be a real number for binary variables (can be encoded in the log it space), and a full distribution in the general case. However, the unary representations can be otherwise determined.

Deriving the message functions to encode the graphical representation's graphical parameters into the inference network. The message functions ($f_{\theta_{ij}}(\cdot)$) are preferably determined from the graphical parameters (and therefore inherit the potential function's parameters) and the temperature, but can be otherwise determined.

In a specific example of a PGM with only pairwise factors and with the messages (m) mapped to log-space, the predictions of the inference network (QT-NN) and messages from each layer to the next can be written as:

$$m_{ij}^{(0)} = 0 \quad (2)$$

$$m_{ij}^{(n)} = f_{\theta_{ij}}\left(\theta_i + u_i + \sum_{k \neq j} m_{ki}^{(n-1)}; T\right)$$

$$\hat{v}_i = \text{softmax}\left(\theta_i + u_i + \sum_{k} m_{ki}^{(N)}\right)$$

or, in vectorized format:

$$m^{(0)} = \{\ \} \ m^{(n)} = f_\theta(m^{(n-1)}, u; T) \hat{v} = g_\theta(m^{(N)}, u) \quad 3$$

where $m_{ij}$ is the message passed from variable i to variable j, and where $\hat{v}_i$ is a belief for variable i. Here, $m^{(n)}$ can collect all messages that exit the previous layer (n-1) and enter layer n. However, the message functions can be otherwise derived.

In a second variant, determining the inference network can include determining the inference equations with trained graphical parameters, and unrolling the inference equations to generate a trained inference network. The trained graphical parameters can be determined using Sum-product algorithm, max-product algorithm, Monte Carlo techniques, Markov Chain Monte Carlo, and/or any other suitable algorithm.

In a third variant, the inference network can be determined as discussed in Lazaro-Gredilla, M. et al, 2020, Query Training: Learning a Worse Model to Infer Better Marginals in Undirected Graphical Models with Hidden Variables. In *Association for the Advancement of Artificial Intelligence*, submission; and/or Lázaro-Gredilla, M. et al, 2020, Query Training: Learning and inference for directed and undirected graphical models, arXiv:2006.06803v2 [stat.ML]; each of which is incorporated in its entirety by this reference.

However, the inference network can be otherwise determined.

Determining a query distribution S300 can function to define a distribution from which to sample train queries that can be used to train the inference network, evaluate the performance of the inference network, and/or answer inference queries. Alternatively, a single query can be used instead of a query distribution. The query distribution preferably describes the distribution of possible inference queries that will occur during inference (e.g., follows the expected use of the trained inference network at test time), but can be any other suitable distribution.

Inference queries are preferably the questions that are to be answered during inference. Examples of inference queries include: infilling, segmentation, pattern recognition, classification, segmentation, semantic segmentation, and/or other queries.

The query distribution can be determined contemporaneously with S200, determined before S200, and/or determined at any other suitable time. The query distribution can be a statistical distribution (e.g., uniform, gaussian, Poisson, binomial, etc.) and/or any other distribution. The query distribution can be determined automatically by the processing system, manually determined, determined from one or more inference queries, determined from the training data and corresponding ground truth, and/or otherwise determined. The query distribution can be determined based on rules, heuristics, and/or any other suitable information. The query distribution can be determined based on the dataset, the intended use, and/or any other suitable information.

The query distribution can be multidimensional, single-dimensioned, or have any other suitable number of dimensions. The dimensions can correspond to query parameters, such as query type, format, location, size, shape, transparency, accuracy, precision, noise, numerosity, image features (e.g., edges, corners, etc.), and/or other parameters. A different distribution can be determined for each dimension (e.g., parameter); alternatively, each dimension (e.g., parameter) can have the same distribution. Examples of query parameters for inpainting include: various numbers, sizes, shapes, spatial distributions, transparencies, and/or other parameters of missing blocks. Examples of query parameters for image segmentation can include: various noise levels in the background, foreground, image features (e.g., edges, corners, lines, etc.), target object parameters (e.g., size, location, pose, etc.), and/or other queries.

In a first variation, S300 includes: receiving the query distribution from a user. In this variation, the user can specify: query parameters (e.g., variables, factors, etc.), the distribution per parameter, and/or any other suitable information. In a specific example, the user can specify that the query distribution is uniform.

In a second variation, S300 includes: receiving a set of potential or sample inference queries, and determining the distribution of inference queries as the query distribution. In a first example, the inference queries are directly determined from the training data (e.g., from what the training data is missing). In a second example, the inference query can be received from a user (e.g., as a task). However, the inference queries can be otherwise determined.

In a third variation, S300 includes receiving training data pairs of inputs and corresponding ground truth (e.g., desired output), wherein the query distribution is determined from the distribution of train data pairs. However, S300 can be retrieved from a database or otherwise determined.

In an example of S300, when the use case is inpainting, the query includes a block of pixels in an image to estimate and the remaining image pixels are evidence. Thus, the query distribution is defined to give equal probability to all queries in which one block of pixels is missing and the rest of the pixels are evidence, and zero probability to all other queries.

However, the query distribution can be otherwise determined.

Sampling a train query from the query distribution S400 can function to determine a train query that can be used to train the inference network. The train query can function to describe or simulate inference queries. S400 can include sampling one or more train queries. Each sampled query can be used to split input variables and output variables in a train data sample (e.g., by masking out the ground truth values of the output variables of the train data sample with the train query). The masked-out ground truth values of the output variables can be used as a label representation in S500 to compare the estimated output values against. The comparison can be used to train the inference network. The train queries can be used in S500 to train the inference network (e.g., learn weights for the graphical parameters).

The train query preferably functions to split a train data sample into input variables and output variables, wherein each variable is with associated ground truth values. The ground truth values of the input variables can be used in S500 as input to the inference network. The ground truth values of the output variables can be used as a label representation in S500 to compare the estimated values for the output variables against.

The train query is preferably the same dimension as the train data samples. The train query can be a binary mask, multi-valued mask, differences or relationships between the test data and corresponding ground truth, and/or any other suitable value. Each train query can be a vector, matrix, and/or any other suitable data structure that is preferably the same dimension as the data sample used in S500 to train the inference network. Each query can be binary valued, have a value from a continuum, probability valued (e.g., any value from 0-1.0, such as to incorporate soft evidence), and/or any other suitable value.

The train query is preferably independent of the train data (e.g., the train query defines an image mask having a specific size, shape, and location, wherein the train data can be any complete image), but can be generic to the train data (e.g., the query can be to classify the train data), determined from the train data, or be otherwise related to the train data.

Sampling the train query can be performed contemporaneously with S500, performed before S500, and/or performed at any other suitable time. In a first example, the train query can be sampled from the query distribution before S500 and stored in the datastore, wherein the train query can be retrieved during training the inference network in S500. In a second example, during training the inference network in S500, a train query can be sampled and/or a batch of train queries can be sampled per training iteration.

The train query can be: sampled from a query distribution, inherently defined by a training pair (e.g., including an input and the corresponding ground truth), and/or otherwise determined. The train query can be sampled using ancestral sampling, Gibbs sampling, Monte-Carlo method, Markov Chain Monte Carlo (MCMC), sampled randomly, using a low-discrepancy sequence, evenly sampled, and/or any sampled using other suitable sampling algorithm.

In a first example, sampling a train query includes randomly sampling a train query (e.g., optionally with a set of query parameter values) from the query distribution. In a second example, sampling a train query includes sampling a query parameter value for each query parameter from the respective distribution according to the sampling algorithm. However, the train query can be otherwise sampled.

In a specific example, S400 includes determining an image mask describing a query. In particular, the training mask is drawn from the query distribution, randomly attributing variables to the roles of evidence or target, and is representative of a mask given by the query during test time.

However, sampling the plurality of train queries and inference query can be otherwise performed.

The method can optionally include determining train data samples, which functions to determine training inputs. The train data can be sampled concurrently, contemporaneously, before, or after S400 and/or S500; but can alternatively be sampled at any other suitable time.

The train data is preferably the training input, but can additionally or alternatively be part of a training pair, or be otherwise used. The training pair can include the train data (e.g., the input; data modified with the train query; input variables with known values; etc.), ground truth (e.g., pre-associated label; inverse of the train query; values for output variables; values for input variables with previously-unknown values; etc.), and/or other data.

The train data (and/or training pair) is preferably sampled from a dataset, but can be synthetic (e.g., generated from seed data via transformations, noise addition, etc.), sampled from an inference data distribution (e.g., obtained and/or sampled in a similar method to query sampling), and/or otherwise determined.

The dataset can include train data samples from which to train the inference network, and is preferably representative of the potential inference data (e.g., types, distribution, etc.) that will be used during inference. The dataset can optionally include inference data samples, and/or any other suitable samples.

The data samples can be sampled from the dataset: randomly, using ancestral sampling, and/or any other sampling algorithm; received from a user; or otherwise determined. The data samples can be sampled based on the use case and/or otherwise sampled. The data samples can be vectors, matrices, and/or any other suitable data structure with a predetermined dimension. The data samples can include images, text, audio, video, financial data, masks, and/or any other suitable data. Each data sample can include one or more variables (e.g., continuous, discrete, binary, etc.) and associated values. Each variable (e.g., continuous variables) can be approximated by a statistical distribution with known statistics (e.g., a gaussian with known mean and variance, Poisson with known parameters lambda, etc.). Examples of the variables include: a pixel of an image, a word in text, a distribution per time period and/or any other suitable variable. However, the dataset can additionally or alternatively include any other elements.

However, the train data samples can be otherwise determined.

Determining a trained inference network S500 can function to determine a generalized PGM-based inference network that is capable of answering multiple queries without retraining. The inference network preferably includes a set of neural network layers, wherein each layer shares the same set of network weights (e.g., the same value for each weight; the same value for each graphical parameter). However, the inference network can be otherwise structured.

The trained inference network is preferably determined by training the untrained inference network using the plurality of train queries (and optionally, train data samples), such that values for the graphical parameters are learned. In particular, S500 can determine the parameters that maximize the accuracy of the inference algorithm under the query distribution. The inference network can be trained for a predetermined number of training iterations (e.g., M, which can be the same or different from N, the number of PGM iterations) until the parameters of the inference network reach convergence and/or any other suitable stopping criteria is met. The trained inference network preferably includes learned values for the graphical parameters, the temperature, and/or any other suitable parameters of the inference network. Additionally or alternatively, the temperature parameter can be predetermined (e.g., not learned during S500, such as set to 0, set to 1, and/or set to any value between 0-1, greater than 1, less than 0, and/or any other suitable value). Alternatively, the trained inference network can be determined from a trained graphical representation's weights (e.g., the weights or constants from a trained PGM's potential function), or otherwise determined.

In a first example, S500 can include: determining a unary representation; determining an output (prediction) using the untrained inference network given the unary representation (and optionally, graphical parameters from a prior iteration); evaluating the output against the training data; and updating (e.g., recalculating) the graphical parameters based on the evaluation. This can be repeated until a predetermined condition is met (e.g., M iterations is met, convergence, etc.).

In this example, the unary representation can be determined by determining a train data sample from the datastore, determining a train query (e.g., sampled from the query distribution), and determining the unary representation by masking the train data sample with the train query to isolate the evidence (e.g., input variables and associated ground truth values) from the output variables (e.g., variables with associated values to be estimated by the inference network), wherein the inference network is trained to estimate the values of the output variables given the evidence (e.g., conditioning on all of the ground truth values of the input variables to predict each value of each output variable value). One or more unary representations can be determined using the same data sample and multiple train queries; additionally or alternatively, one or more unary representations can be determined using the same train query and multiple data samples, a single train query and data sample pair, and/or other set of data. The unary representation can be fed as input into the inference network (e.g., at each layer of the inference network, at the first layer, etc.). The inference network can determine estimated values for the output variables, which can compared to the ground truth values for the output variables (e.g., by inverse masking the train data sample with the train query). The comparison can be cross entropy, mean square error, hinge loss, and/or any other suitable loss function. The comparison can be used to train the network using a training method. Examples of training methods that can be used include: backpropagation, stochastic gradient descent, (SGD), gradient methods, gradient descent, difference target propagation, Hilbert-Schmidt Independence Criterion (HSIC) bottleneck, online alternating minimization with auxiliary variables, synthetic gradients, and/or any other suitable training method to determine the graphical parameter values). In a specific example, the graphical parameter values can be learned by minimizing the cross-entropy between the data and the estimated outputs (predictions), averaged over the query distribution. However, the parameters can be otherwise learned. An example is depicted in FIG. 4.

Alternatively, the unary representations can be pre-generated by masking a plurality of train data samples each with a train query of the plurality and storing the unary representation and label (e.g., the inverse query masked with the train data sample) in the datastore. The unary representation and label can be retrieved from the datastore to train the inference network.

In a second example, S500 can include receiving a training pair including train data and corresponding ground truth; determining the output (prediction) using the untrained inference network, given the train data; comparing the output to the respective ground truth; and updating (e.g., recalculating) the graphical parameters based on the evaluation (e.g., as discussed in the first example). This can be repeated until a predetermined condition is met (e.g., M iterations is met, convergence, etc.).

However, the trained inference network can be otherwise determined.

The method can optionally include determining an inference query, which functions to determine one or more queries to evaluate the inference network and/or answer queries related to the graphical representation. The inference query can be determined: as part of S400, separately from S400, before or after S500, before or after S600, or at any other suitable time. One or more inference queries can be determined and evaluated.

The inference query is preferably within the query distribution (used to sample train queries for inference network training), but can alternatively be outside of the query distribution or partially within the query distribution. The inference query is preferably different from the train queries (e.g., differ in one or more parameters), but can alternatively be the same as a train query. The inference queries are preferably the same dimension as the inference data samples. The inference queries can be the same format as the train queries or different from the train queries.

The inference query can be: received from a user or other endpoint (e.g., a robot, a client, an API, etc.), sampled from the query distribution (e.g., in the same or similar manner to test query sampling in S400), determined from or inherent within the inference input (e.g., be the portion of an image missing from the inference input), and/or otherwise determined.

In one example, the inference query for an infilling use case can include an image with a missing segment, wherein the inference network determines the missing segment. In a second example, the inference query for a segmentation use case can include a noisy image of an object within an environment, wherein the inference network determines the boundaries (e.g., edges) of the object. However, the inference query can be otherwise defined.

The method can optionally include determining an inference query result for the inference query, using the trained inference network S600, which can function to determine an inference query result using the inference query and optionally an inference data sample sampled from the dataset. The inference query result is preferably an estimate of the output variables defined by the inference query. The inference query can be different from the train queries (e.g., define one or more different output variables than the output variables used to train the inference network in S500). In operation, the inference query (e.g., inference data, inference input) is fed to the trained inference network, and the trained inference network outputs a prediction. However, the inference query result can be otherwise determined.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method, comprising:
    determining a graphical representation comprising graphical parameters;
    determining inference equations for the graphical representation, wherein the inference equations comprise the graphical parameters;
    determining an untrained inference neural network, comprising the graphical parameters, by unrolling the inference equations for a predetermined number of iterations into the untrained inference neural network;
    determining a query distribution;
    sampling a plurality of train queries from the query distribution;
    determining a trained inference neural network by training the untrained inference neural network to determine estimated output values of output variables of a unary representation, wherein the output variables are determined with a train query of the plurality of train queries; and
    determining an inference query result for an inference query using the trained inference neural network, wherein the inference query is within the query distribution but different from the train queries.

2. The method of claim 1, wherein the graphical representation is an undirected probabilistic graphical model.

3. The method of claim 1, wherein the graphical representation comprises a hidden variable.

4. The method of claim 1, wherein the trained inference neural network comprises values for the graphical parameters, determined by training the untrained inference neural network.

5. The method of claim 4, wherein the values for the graphical parameters are the same for each layer of the trained inference neural network.

6. The method of claim 1, wherein the train queries and the inference query are binary valued vectors.

7. The method of claim 1, wherein training the untrained inference neural network comprises:
    receiving the training data, comprising input variables, the output variables, and associated ground truth values for the input variables and the output variables, from a training dataset;
    determining the unary representation comprising the input variables and the output variables by masking out the ground truth values of the output variables using the train query of the plurality of train queries;
    feeding the unary representation into the untrained inference network, wherein the inference neural network determines estimated values for each variable of the unary representation;
    comparing the estimated output values of the output variables and the ground truth values of the output variables; and
    updating the graphical parameters of the untrained inference neural network based on the comparison.

8. The method of claim 7, wherein each value of the estimated output variables is estimated by conditioning on all of the ground truth values of the input variables.

9. The method of claim 7, wherein the input variables and the output variables are continuous.

10. The method of claim 9, wherein each variable is approximated by a distribution with known statistics.

11. The method of claim 10, wherein the distribution is a gaussian distribution.

12. The method of claim 7, wherein the variables represent an image, wherein the input variables represent known image pixel values and the output variables represent image pixels that are estimated by the untrained inference network.

13. The method of claim 1, wherein the inference equations are determined based on a potential function of the graphical representation, wherein the potential function comprises the graphical parameters.

14. The method of claim 1, wherein the inference equations are derived from belief propagation equations.

15. The method of claim 1, the graphical representation is a Markov random field.

16. The method of claim 1, the query distribution is determined based on a use case.

17. The method of claim 16, the untrained inference neural network is further trained on training data, wherein the training data is sampled from a data distribution determined based on the use case.

18. A system, comprising a non-transitory computer readable medium having stored thereon software instructions that, when executed by a processing system, cause the processing system to estimate inference variable values for inference variables of an inference query using a trained inference neural network, wherein the trained inference neural network is determined by:
    determining a query distribution;
    sampling a train query from the query distribution, wherein the train query is different from the inference query;
    receiving variables and associated values from a training dataset;
    splitting the variables into input variables and output variables using the train query;
    outputting estimated values for the output variables and values for the input variables by an untrained inference neural network, wherein the untrained inference neural network comprises N layers and is defined by unrolling inference equations, derived from a graphical representation, for N iterations;
    training the inference neural network based on a comparison of the estimated values and known values for the output variables.

19. The method of claim 18, wherein the inference variable values are associated with an inference query, and wherein the train queries and the inference query are both within the query distribution.

20. The method of claim 18, wherein the N layers all share a common set of weights, wherein the weights are determined from graphical parameters of the graphical representation.

* * * * *